(12) United States Patent
Ichihashi

(10) Patent No.: US 12,551,721 B2
(45) Date of Patent: Feb. 17, 2026

(54) RADIOTHERAPY PLANNING APPARATUS AND RADIOTHERAPY SYSTEM

(71) Applicant: Canon Medical Systems Corporation, Otawara (JP)

(72) Inventor: Masahide Ichihashi, Otawara (JP)

(73) Assignee: Canon Medical Systems Corporation, Otawara (JP)

( * ) Notice: Subject to any disclaimer, the term of this patent is extended or adjusted under 35 U.S.C. 154(b) by 266 days.

(21) Appl. No.: 18/346,938

(22) Filed: Jul. 5, 2023

(65) Prior Publication Data
US 2024/0009484 A1 Jan. 11, 2024

(30) Foreign Application Priority Data

Jul. 5, 2022 (JP) .................. 2022-108446

(51) Int. Cl.
*A61N 5/10* (2006.01)
(52) U.S. Cl.
CPC .......... *A61N 5/1039* (2013.01); *A61N 5/1045* (2013.01)
(58) Field of Classification Search
None
See application file for complete search history.

(56) References Cited

U.S. PATENT DOCUMENTS

| | | | |
|---|---|---|---|
| 11,559,702 B2 | 1/2023 | Labarbe et al. | |
| 12,076,585 B2* | 9/2024 | Takayanagi | A61N 5/1031 |
| 2006/0293583 A1* | 12/2006 | Saracen | A61N 5/1038 600/407 |
| 2012/0230462 A1* | 9/2012 | Robar | A61B 6/4085 378/65 |
| 2019/0022409 A1* | 1/2019 | Vanderstraten | A61N 5/1081 |
| 2019/0022411 A1* | 1/2019 | Parry | A61K 31/404 |
| 2020/0282234 A1* | 9/2020 | Folkerts | A61N 5/1031 |
| 2020/0384289 A1* | 12/2020 | Smith | G16H 20/40 |
| 2021/0393982 A1* | 12/2021 | Lansonneur | A61N 5/1031 |
| 2022/0323791 A1* | 10/2022 | Kang | A61N 5/1042 |

FOREIGN PATENT DOCUMENTS

JP 2022-13781 A 1/2022

* cited by examiner

*Primary Examiner* — Marcus H Taningco
(74) *Attorney, Agent, or Firm* — Oblon, McClelland, Maier & Neustadt, L.L.P.

(57) ABSTRACT

A radiotherapy planning apparatus includes processing circuitry. The processing circuitry obtains a medical image relating to a patient. The processing circuitry obtains number of beams and beam directions of a plurality of radiation beams applied substantially simultaneously to an irradiation area of the patient. The processing circuitry generates a total dose rate distribution which is a spatial distribution of total values of predicted dose rates of the radiation beams to be applied to the patient, based on the medical image and the number and the direction of the radiation beams.

10 Claims, 11 Drawing Sheets

SA1: Obtain medical image I1

SA2: Set various volumes

SA3: Set beam conditions

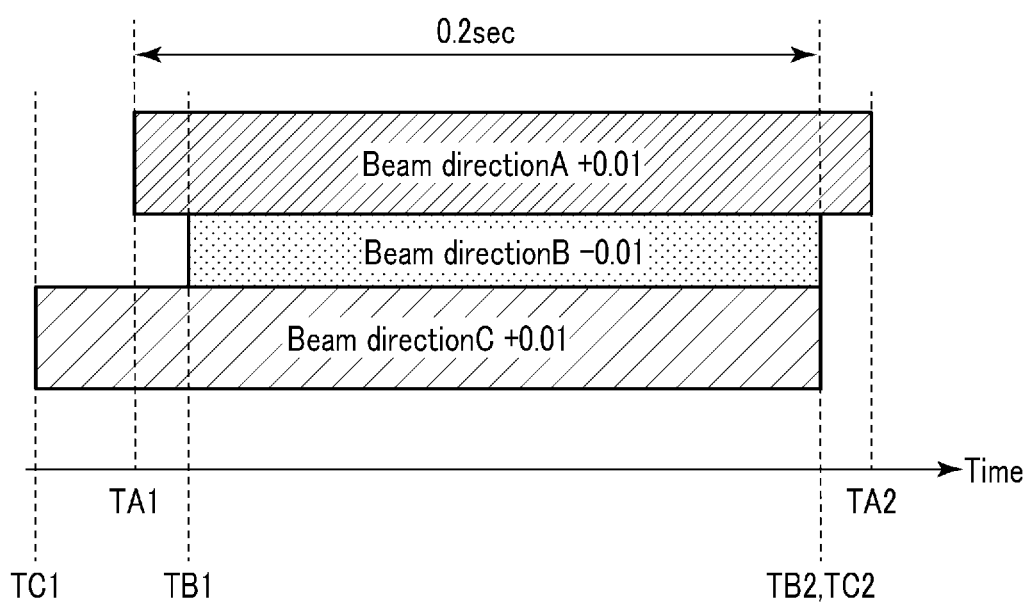
F I G. 13

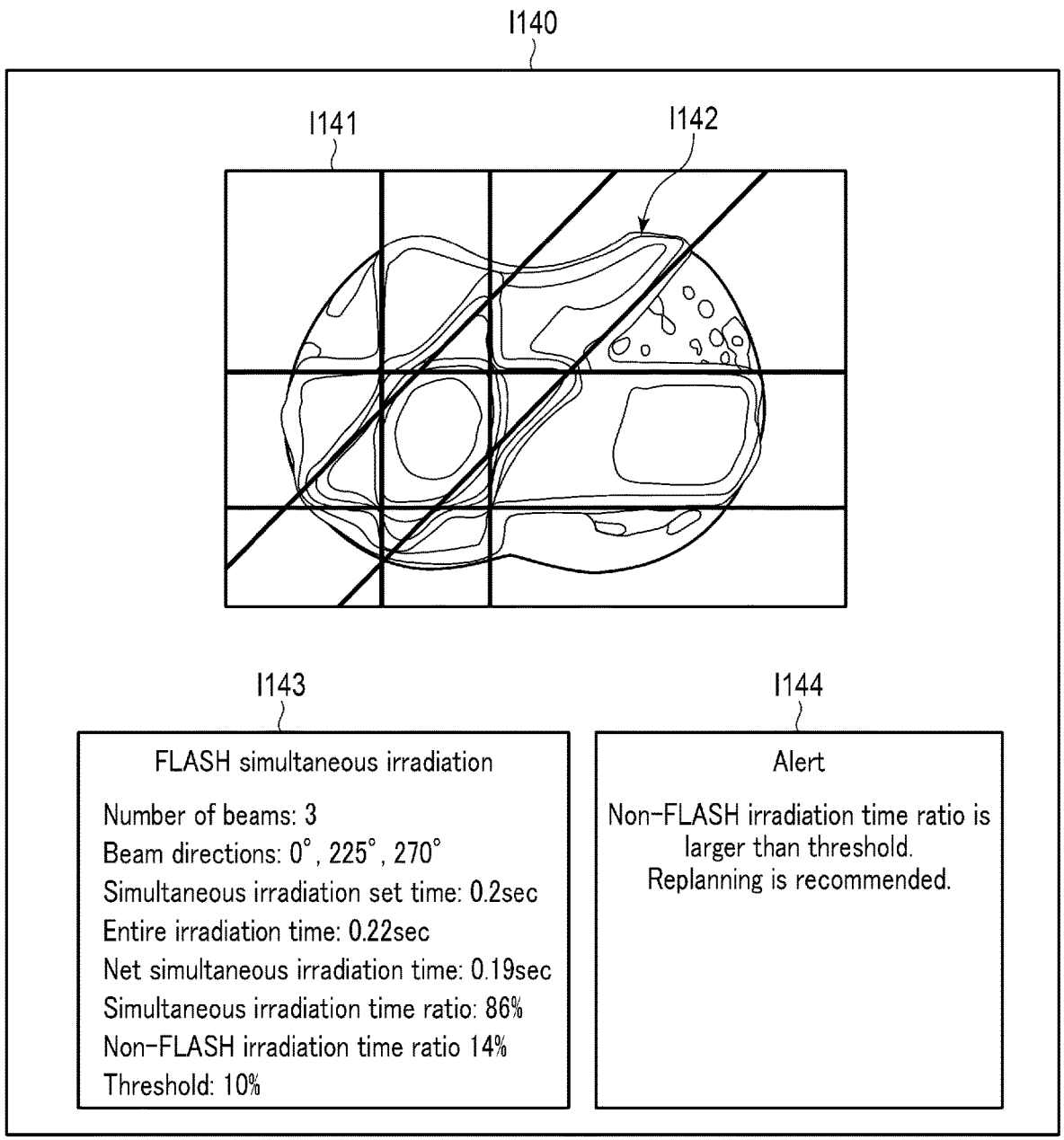
F I G. 14

RADIOTHERAPY PLANNING APPARATUS AND RADIOTHERAPY SYSTEM

CROSS-REFERENCE TO RELATED APPLICATION(S)

This application is based upon and claims the benefit of priority from prior Japanese Patent Application No. 2022-108446, filed Jul. 5, 2022, the entire contents of which are incorporated herein by reference.

FIELD

Embodiments described herein relate generally to a radiotherapy planning apparatus and a radiotherapy system.

BACKGROUND

A high dose-rate and short radiation method called "FLASH radiotherapy" is known in the field of radiotherapy. FLASH radiotherapy is a technique enabling suppressing damage of healthy tissue and selectively damaging a tumor by radiation at a high dose-rate (for example, 40 Gy/sec) for a short time. It has also been proposed to use simultaneous irradiation in combination with FLASH radiotherapy. In radiotherapy using simultaneous irradiation in combination with FLASH radiotherapy, no means for accurately understanding a dose to be applied to the patient.

BRIEF DESCRIPTION OF THE DRAWINGS

FIG. 13 is a diagram illustrating an example of calculation of a simultaneous irradiation time ratio.

FIG. 14 is a diagram illustrating an example of a display screen displayed at Step SB6.

DETAILED DESCRIPTION

According to one embodiment, a radiotherapy apparatus includes a processing circuitry. The processing circuitry obtains a medical image relating to a patient, obtains number of beams and beam directions of a plurality of radiation beams to be applied substantially simultaneously to an irradiation area of the patient, and generates a total dose rate distribution which is a spatial distribution of total values of predicted dose rates of the radiation beams to be applied to the patient, based on the medical image and the number and the direction of the radiation beams.

The following is a detailed explanation of embodiments of the radiotherapy planning apparatus and a radiotherapy system with reference to the drawings.

Figure 1:
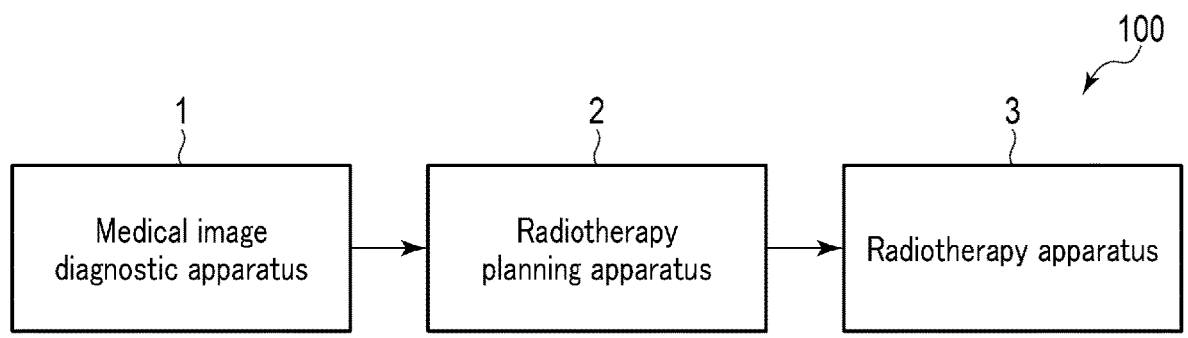
FIG. 1 is a diagram illustrating a configuration example of a radiotherapy system according to an embodiment.

FIG. 1 is a diagram illustrating a configuration example of a radiotherapy system 100 according to the present embodiment. As illustrated in FIG. 1, the radiotherapy system 100 includes a medical image diagnostic apparatus 1, a radiotherapy planning apparatus 2, and a radiotherapy apparatus 3. The medical image diagnostic apparatus 1, the radiotherapy planning apparatus 2, and the radiotherapy apparatus 3 are connected to each other via a network such that they can communicate with each other. The radiotherapy system 100 is a system with which a radiotherapy plan relating to radiotherapy for a patient is produced and radiotherapy is performed in accordance with the therapy plan.

The medical image diagnostic apparatus 1 performs medical imaging on a patient who is a target for radiotherapy, to produce a medical image used for therapy planning. A medical image may be a two-dimensional image formed of two-dimensionally arranged pixels, or a three-dimensional image formed of three-dimensionally arranged voxels. The medical image diagnostic apparatus 1 may be any type of modality apparatus capable of generating a medical image. Examples of the modality apparatus are an X-ray computed tomography apparatus, a magnetic resonance imaging apparatus, a cone beam CT apparatus, and a nuclear medicine diagnostic apparatus. The medical image is transmitted to the radiotherapy planning apparatus 2, for example.

The radiotherapy planning apparatus 2 is a computer configured to produce a radiotherapy plan for the patient using medical images generated by the medical image diagnostic apparatus 1. The radiotherapy planning apparatus 2 produces a radiotherapy plan relating to radiotherapy in which a plural number of radiation beams are applied in a plurality of beam directions to the patient substantially simultaneously with a high dose and for a short time. The method for applying radiation beams at a high dose rate and for a short time is referred to as "FLASH radiotherapy". Data of the radiotherapy plan is supplied to the radiotherapy apparatus 3.

The radiotherapy apparatus 3 performs a therapy on the patient with radiation, by performing FLASH radiotherapy (hereinafter referred to as "simultaneous multiple field FLASH irradiation") of simultaneous multiple field FLASH irradiation on the patient in accordance with the radiotherapy plan produced by the radiotherapy planning apparatus 2. In simultaneous multiple field FLASH irradiation, a plurality of radiation beams are substantially simultaneously applied in the beam directions set in the radiotherapy plan.

Figure 2:
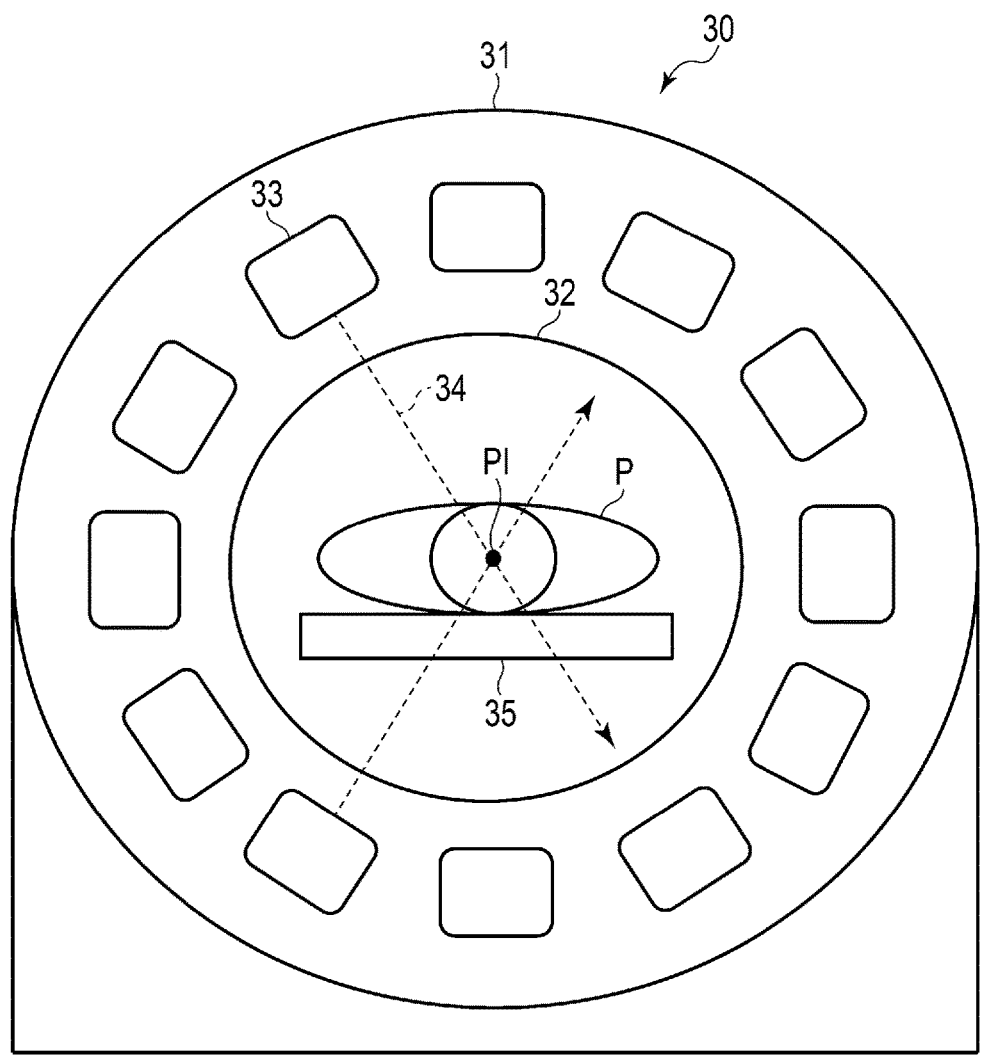
FIG. 2 is a schematic diagram of a treatment gantry provided on a radiotherapy apparatus.

FIG. 2 is a schematic diagram of a treatment gantry 30 mounted on the radiotherapy apparatus 3. The treatment gantry 30 has a structure capable of performing simultaneous multiple field FLASH irradiation. The treatment gantry 30 includes a housing 31 including an opening 32 having a substantially cylindrical shape. The housing 31 is installed in a radiotherapy room. A plurality of irradiation devices 33 are mounted inside the housing 31 along a circumference including an isocenter PI as a center. Each of the irradiation devices 33 emits a radiation beam in accordance with the radiotherapy plan. The type of radiation beams is not specifically limited, and X-rays, electron beams, carbon ion beams, corpuscular beams, or the like may be properly used. In the following embodiments, suppose that the type of the radiation beams is electron rays. Each of the irradiation devices 33 may be provided with a collimator, such as multi-divided collimator (multi-leaf collimator), to form an irradiation field. As illustrated in FIG. 2, the radiotherapy apparatus 3 includes a treatment bed 35. The treatment bed 35 movably supports a top plate. A patient P is placed on the top plate. The treatment bed 35 moves the top plate such that a treatment target, such as a tumor in the patient P, matches the isocenter PI.

The following is an explanation of an example of a method for allocating the simultaneously applied radiation beams to the irradiation devices 33. Ranges of beam directions (hereinafter referred to as "charge irradiation ranges") of radiation beams are allocated to the respective irradiation devices 33. As an example, identifiers of the irradiation devices 33 are associated with the charge irradiation ranges in a LUT (look up table) or the like. An irradiation schedule is set in the radiotherapy plan. In the irradiation schedule, radiation beam irradiation commands are managed for the respective irradiation devices 33 along the elapsed time from the standard time. Each irradiation command includes the beam direction, the start timing of the radiation beam, the end timing of the radiation beam, and the irradiation duration. In the present embodiment, because simultaneous multiple field FLASH irradiation is performed, the same identifier (hereinafter referred to as "simultaneous irradiation ID) is allocated to the radiation beams that are applied simultaneously.

The radiotherapy apparatus 3 specifies a combination of a plurality of radiation beams with which simultaneous multiple field FLASH irradiation is performed, on the basis of the irradiation schedule or the simultaneous irradiation ID. As an example, if opposed two-field irradiation is performed, two irradiation device 33 that are opposed with the isocenter PI interposed therebetween are used in combination. The radiotherapy apparatus 3 allocates radiation beams forming the specified combination to any of the irradiation devices 33. Specifically, the radiation beams are allocated to the irradiation devices 33 corresponding to the charge irradiation ranges to which the beam directions of the radiation beams serving as the allocation target belong. The radiotherapy apparatus 3 allocates the beam directions, the start timings, the end timings, and the irradiation durations of the radiation beams to the respective irradiation devices 33. In radiotherapy, the radiotherapy apparatus 33 emits a plurality of radiation beams from the allocated irradiation devices 33 along the irradiation schedule. In this manner, simultaneous multiple field FLASH irradiation is performed.

The irradiation devices 33 may be provided to be movable in a limited manner around the isocenter PI, or may be fixed on the housing 31. If they are provided to be movable in a limited manner, each of the irradiation devices 33 emits a radiation beam after moving in the beam direction of the irradiation target. If they are fixed on the housing 31, each of the irradiation devices 33 emits a radiation beam electromagnetically deflected in the beam direction of the irradiation target. The number of irradiation devices 33 mounted on the treatment gantry 30 is not limited to 12, but may be any number as along as it is two or more. However, it should be noted that the degrees of freedom of setting of the number of beams and the beam directions increase as the number of irradiation devices 33 increases.

The following is an explanation of a first embodiment and a second embodiment of the radiotherapy planning apparatus 2.

First Embodiment

Figure 3:
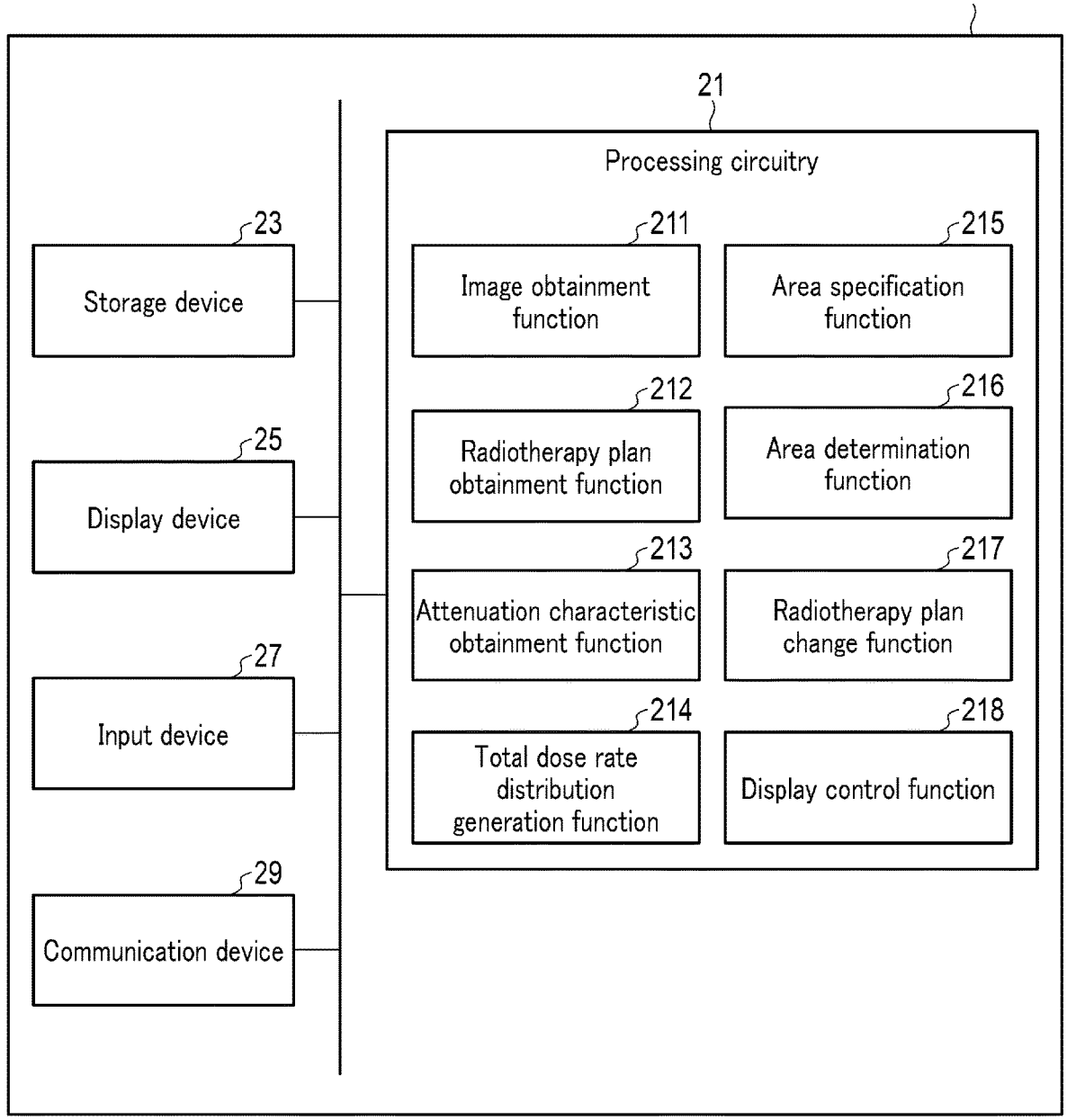
FIG. 3 is a diagram illustrating a configuration example of a radiotherapy planning apparatus according to a first embodiment.

FIG. 3 is a diagram illustrating a configuration example of the radiotherapy planning apparatus 2 according to the first embodiment. The radiotherapy planning apparatus 2 includes a processing circuitry 21, a storage device 23, a display device 25, an input device 27, and a communication device 29. Data communications between the processing circuitry 21, the storage device 23, the display device 25, the input device 27, and the communication device 29 are performed via a bus.

The processing circuitry 21 includes processors, such as a CPU (central processing unit) and a GPU (graphics processing unit). When the processor activates a radiotherapy planning program installed onto the storage device 32, etc., the processor realizes an image obtainment function 211, a radiotherapy plan obtainment function 212, an attenuation characteristic obtainment function 213, a total dose rate distribution generation function 214, an area specifying function 215, an area determination function 216, a radiotherapy plan change function 217, and a display control function 218. Note that the embodiment is not limited to the case in which the respective functions 211 to 218 are realized by a single processing circuit. Processing circuitry may be formed by combining a plurality of independent processors, and the respective processors may execute programs, thereby realizing the functions 211 to 218.

By executing the image obtainment function 211, the processing circuitry 21 obtains a medical image relating to the patient serving as the radiotherapy target person. The medical image is a medical image generated by the medical image diagnostic apparatus 1 and to be used for a radiotherapy plan.

By executing the radiotherapy plan obtainment function 212, the processing circuitry 21 obtains a radiotherapy plan relating to the patient. Elements of the radiotherapy plan are broadly classified into various volumes and beam conditions. Volumes set as the various volumes are an irradiation area serving as the range to which the radiation beam is applied, a tumor area serving as a target of radiotherapy, a normal tissue area that is not a target of radiotherapy, and an OAR (organ at risk) area having a high radiation sensitivity in the healthy tissue area. Conditions set as the beam conditions are the irradiation time, the number of beams, and beam directions of the radiation beams. The processing circuitry 21 obtains the number of beams and beam directions of a plurality of radiation beams to be substantially simultaneously applied to the irradiation area of the patient. The processing circuitry 21 may produce a radiotherapy plan based on the medical image, or receive a radiotherapy plan from another computer.

By executing the attenuation characteristic obtainment function 213, the processing circuitry 21 obtains attenuation characteristics indicating relation between the depth from the body surface of the patient and attenuation of the dose or the dose rate, for each of the beam directions obtained by the radiotherapy plan obtainment function 212.

By executing the total dose rate distribution generation function 214, the processing circuitry 21 generates total dose rate distribution which is a spatial distribution of total values of predicted dose rates of a plurality of radiation beams applied to the patient, based on the medical image obtained by the image obtainment function 211 and the number of beams and the beam directions of the radiation beams obtained by the radiotherapy plan obtainment function 212. The processing circuitry 21 may generate total dose rate distribution based on the attenuation characteristics obtained by the attenuation characteristic obtainment function 213, the medical image, and the number of beams and the beam directions of the radiation beams.

By executing the area specification function 215, the processing circuitry 21 specifies a first internal area (hereinafter referred to as "FLASH effect area") in which a FLASH effect is acquired and/or a second internal area (hereinafter referred to as "non-FLASH effect area") in which no FLASH effect is acquired, based on the total dose rate distribution generated by the total dose rate distribution generation function 214. The term "FLASH effect" means an effect of selectively providing damage to the tumor while suppressing damage to the normal tissue by high dose-rate short-time irradiation.

By executing the area determination function 216, the processing circuitry 21 outputs a determination result as to whether a normal tissue area is included in the non-FLASH effect area set by the area specification function 215. The determination result is displayed by the display control function 218.

By executing the therapeutic function change function 217, the processing circuitry 21 changes the radiotherapy plan acquired by the radiotherapy plan obtainment function 212. As an example, if the area determination function 216 acquires a determination result indicating that a normal tissue area is included in the non-FLASH area, the processing circuitry 21 changes the beam directions, the number of beams, and/or the irradiation time of the radiation beams.

By executing the display control function 218, the processing circuit 21 displays various types of information on the display device 25. As an example, the processing circuitry 21 displays the total dose rate distribution generated by the total dose rate distribution generation function 214. As another example, the processing circuitry 21 displays the FLASH effect area and/or the non-FLASH effect area specified by the area specification function 215 in a visually distinguishable manner. As another example, the processing circuitry 21 displays the determination result output by the area determination function 216.

The storage device 23 is a storage device for storing various types of information, such as a ROM (read only memory), a RAM (random access memory), an HDD (Hard Disk Drive), an SSD (Solid State Drive), or a semiconductor memory device, etc. The storage device 32 is not limited to the above-listed memory devices, but may be a driver that writes and reads various types of information to and from, for example, a portable storage medium, such as a compact disc (CD), a digital versatile disc (DVD), a flash memory, or a semiconductor memory device. The storage device 32 may be provided in an external computer connected to the radiotherapy planning apparatus 2 via a network. For example, the storage device 32 stores a therapy planning program, etc.

The display device 25 displays various types of information in accordance with the display control function 218 of the processing circuitry 21. As the display device 25, for example, a liquid crystal display (LCD), a cathode ray tube (CRT) display, an organic electro luminescence display (OELD), a plasma display, or any other display can be used as appropriate. The display device 25 may be a projector.

The input device 27 accepts various kinds of input operations from a user, such as an operator, converts the accepted input operations into electric signals, and outputs the electric signals to the processing circuitry 21. Specifically, as the input device 27, a mouse, a keyboard, a trackball, a switch, a button, a joystick, a touchpad, a touch panel display, etc. can be used as appropriate. The input device 27 outputs an electrical signal corresponding to an input operation to the input device to the processing circuitry 21. The input device 27 may be a speech recognition device that converts an audio signal collected by a microphone into command signals. The input device 34 may be an input device provided in an external computer connected to the system via a network, etc.

The communication device 29 is an interface for data communication with other apparatuses included in the radiotherapy system 100. For example, the communication device 29 receives a medical image from the medical image diagnostic apparatus 1 via the network. The communication device 29 transmits a therapy plan to the radiotherapy apparatus 3 via the network.

The following is an explanation of a therapy planning process by the radiotherapy planning apparatus 2 according to the first embodiment.

Figure 4:
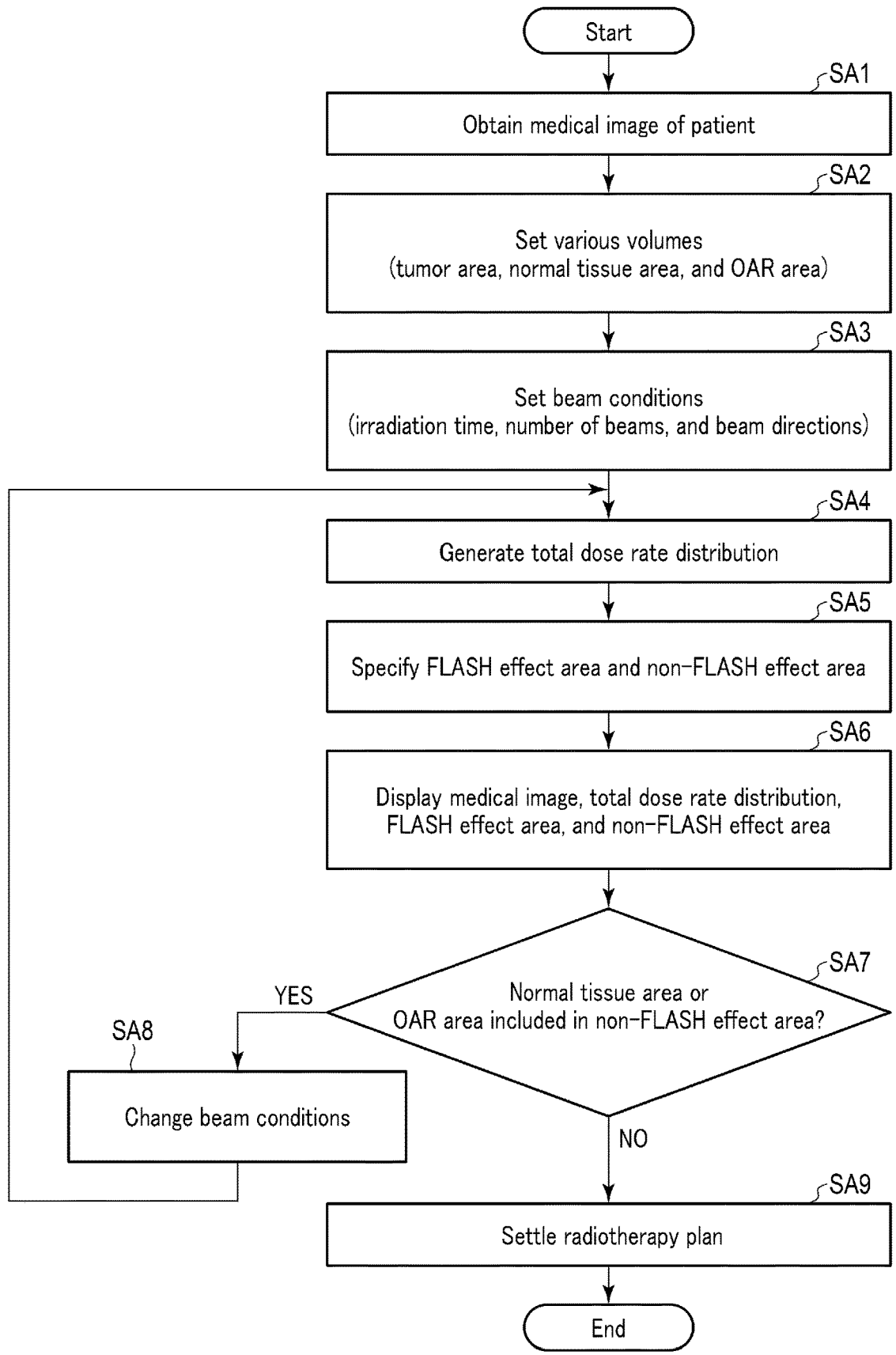
FIG. 4 is a diagram illustrating a procedure of a therapy planning process by a radiotherapy planning apparatus 2 according to the first embodiment.

FIG. 4 is a diagram illustrating a procedure of a therapy planning process by the radiotherapy planning apparatus 2 according to the first embodiment.

First, the processing circuitry 21 obtains a medical image of the patient by executing the image obtainment function 211 (Step SA1). At Step SA1, the processing circuitry 21 obtains a medical image of the patient acquired by the medical image diagnostic apparatus 1. The acquisition method is not specifically limited, but, as an example, the processing circuitry 21 can obtain a medical image received from the medical image diagnostic apparatus 1 via the communication device 29.

To specifically explain the therapy planning process according to the first embodiment, suppose that the modality type of the medical image diagnostic apparatus 1 is an X-ray computed tomography apparatus, and accordingly the medical image is a CT image. The therapy planning process according to the first embodiment does not limit the imaged region of the medical image but, as an example, the imaged region is a chest including breast. The supposed clinical example is breast cancer.

Figure 5:
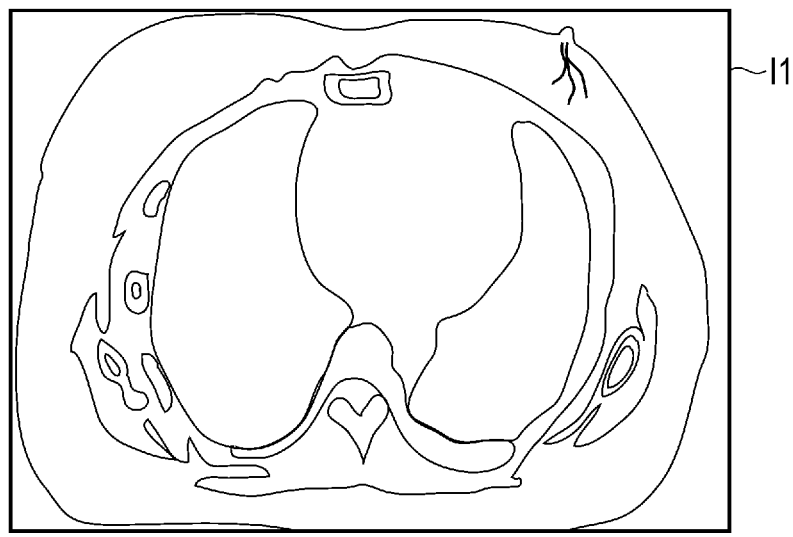
FIG. 5 is a diagram illustrating a medical image obtained at Step SA1.

FIG. 5 is a diagram illustrating a medical image I1 acquired at Step SA1. As illustrated in FIG. 5, in the medical image I1, an internal structure of the chest including the breast of the patient is drawn. A tumor is included in the right mamma.

When Step SA1 is performed, the processing circuitry 21 sets various volumes (tumor area, normal tissue area, and OAR area) by executing the radiotherapy plan obtainment function 212 (Step SA2). At Step SA2, the processing circuitry 21 sets the tumor area, the normal tissue area, and the OAR area for the medical image obtained at Step SA1.

Figure 6:
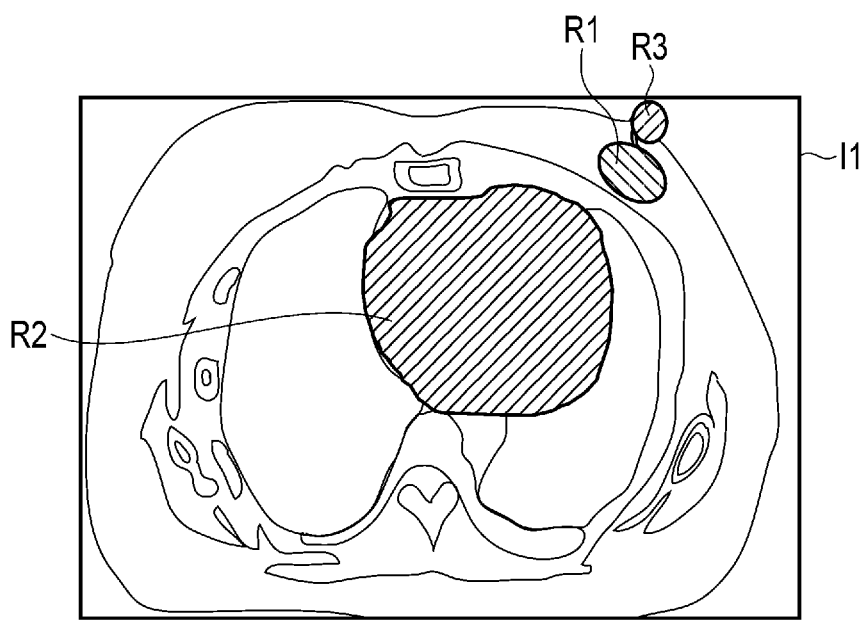
FIG. 6 is a diagram illustrating the medical image for which various volumes are set at Step SA2.

FIG. 6 is a diagram illustrating the medical image I1 in which the various volumes are set at Step SA2. As illustrated in FIG. 6, in the present example, a tumor area R1 is set as an image area (tumor area) relating to the tumor occurring inside the mamma. As an example, an OAR area R2 is set as an image area (heart area) relating to the heart and located in the vicinity of the mamma including the tumor. As an example, a normal tissue area R3 is set as an image area (nipple area) relating to a nipple existing in the mamma. In the processing circuitry 21, the tumor area R1, the OAR area R2, and the normal tissue area R3 may be manually set by the user via the input device 27, or may be automatically set by an image recognition process. Setting of the OAR area R2 and the normal tissue area R3 is not indispensable, but it is unnecessary to set the areas if no corresponding areas exist.

When Step SA2 is performed, the processing circuitry 21 sets beam conditions (irradiation time, number of beams, and beam directions) by executing the radiotherapy plan obtainment function 212 (Step SA3). At Step SA3, the processing circuitry 21 sets beam conditions, such as the irradiation time, the number of beams, and the beam directions of the radiation beams, for the medical image obtained at Step SA1.

Figure 7:
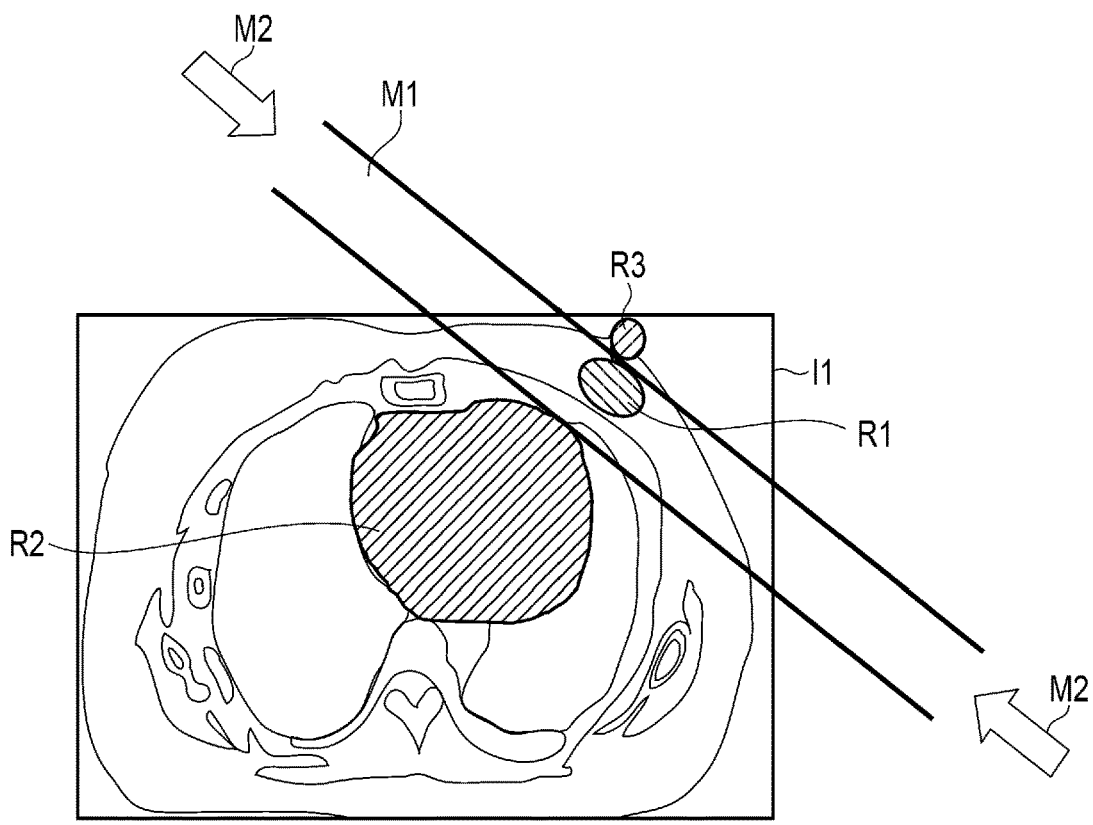
FIG. 7 is a diagram illustrating the medical image for which beam conditions are set at Step SA3.

FIG. 7 is a diagram illustrating the medical image I1 for which the beam conditions are set at Step SA3. As illustrated in FIG. 7, in the present example, suppose that FLASH irradiation is executed by simultaneous irradiation with the two opposed fields. In this case, the number of beams is set to 2. The beam directions indicate the gantry angles at which the irradiation devices 33 emitting the two respective radiation beams that are simultaneously applied are positioned. The beam directions are set such that the tumor area R1 is included in an irradiation path M1 of the radiation beams and the OAR area R2 and the normal tissue area R3 are not included in the irradiation path M1. It may be permitted that part or whole of the OAR area R2 and the normal tissue area R3 are included in the irradiation path M1.

Various methods may be adopted as the method for setting the number of beams and the beam directions by the processing circuitry 21. As an example, the number of beams and the beam directions may be designated with numerical values via the input device 27 or the like. In this case, for user's check, the display device 25 displays the irradiation path M1 with the number of beams and the beam directions corresponding to the designated numerical values in a state of being superimposed on the medical image I1. As another example, a drawing pattern (overlay) indicating a provisional irradiation path M1 is displayed in a state of being superimposed on the medical image I1, and the number of beams and the beam directions corresponding to the drawing pattern may be set by operating the drawing pattern, such as increase, decrease, enlargement, reduction, movement, and rotation, via the input device 27 or the like. In the case of using two opposed fields, the number of simultaneously applied beams cannot be determined from the number of drawing pattern (irradiation path M1). For this reason, arrows M2 or the like may be displayed to indicate the beam directions of the respective radiation beams. As the irradiation time, a time length for which the radiation beams are simultaneously applied is set. The irradiation time can be designated with numerical values via the input device 27.

When Step SA3 is performed, the processing circuitry 21 generates total dose rate distribution by executing the total dose rate distribution generation function 214 (Step SA4). At Step SA4, the processing circuitry 21 generates total dose rate distribution serving as spatial distribution of total values of predicted dose rates of a plurality of radiation beams applied to the patient, based on the medical image obtained at Step SA1 and the number of beams and the beam directions of the radiation beams set at Step SA2. More specifically, the processing circuitry 21 obtained attenuation characteristics indicating relation between the depth from the body surface of the patient and the attenuation of the dose or the dose rate for each of the set beam directions of the radiation beams, and generates total dose rate distribution based on the attenuation characteristics, the medical image, and the number of beams and the beam directions of the radiation beams. The following is a detailed explanation of Step SA4.

First, the processing circuitry 21 obtains attenuation characteristics by executing the attenuation characteristic obtainment function 213. Suppose that the attenuation characteristics are generated by the processing circuitry 21 in advance and stored in the storage device 23. The processing circuitry 21 calculates the attenuation rate of the dose or the dose rate from each beam direction set at Step SA3, based on the CT image serving as the medical image obtained at Step SA1. As an example, the processing circuitry 21 calculates the degree of attenuation of the dose rate associated with the depth from the body surface of the patient for each beam direction by simulation, and calculates attenuation characteristics indicating relation between the depth from the body surface of the patient and the attenuation rate of the dose rate.

Figure 8:
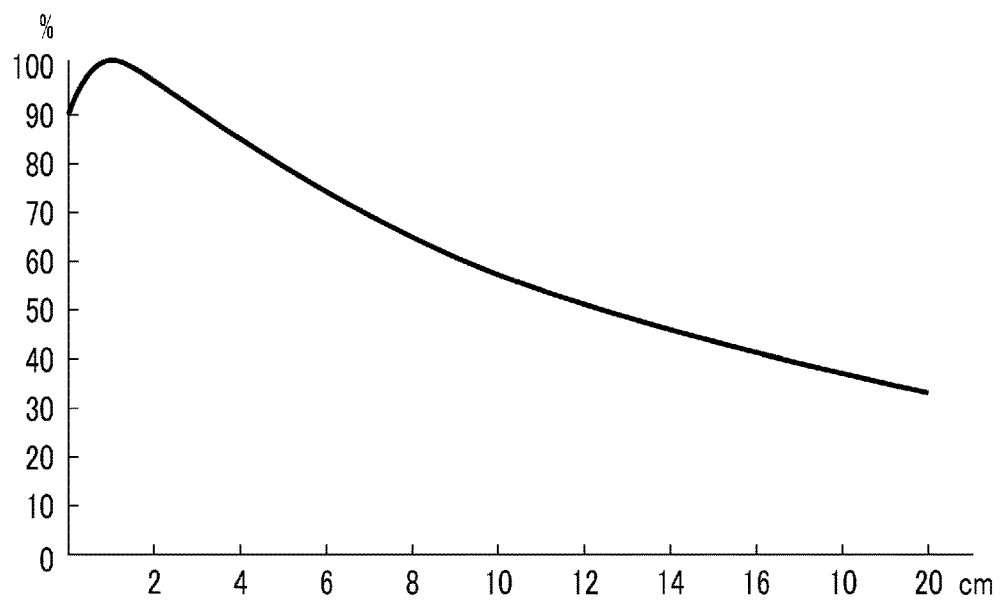
FIG. 8 is a diagram illustrating a graph of attenuation characteristics.

FIG. 8 is a diagram illustrating a graph of attenuation characteristics. As illustrated in FIG. 8, the vertical axis indicates the attenuation rate [%] of the dose rate, and the horizontal axis indicates the depth [cm] from the body surface of the patient. The attenuation rate is normalized such that the peak thereof is 100%. The attenuation rate typically reaches its peak at the depth of approximately 2 cm from the body surface, and thereafter the dose rate attenuates as the distance from the body surface increases. The attenuation rate changes dependently on the type of the tissue through which the radiation passes and/or the mechanical elements, such as collimators, as well as the depth from the body surface.

In addition, the processing circuitry 21 generates dose rate distribution for the irradiation area, based on the medical image, the irradiation dose, and the irradiation time, for each of the beam directions simultaneously applied. The dose rate distribution indicates spatial distribution of predicted values of the dose rate applied to the irradiation area. The processing circuitry 21 corrects the dose rate distribution by applying the attenuation to the dose rate distribution, for each of the beam directions simultaneously applied. In addition, the processing circuitry 21 generates total dose rate distribution by aligning and summing up the corrected dose rate distributions of the simultaneously applied beam directions. The total dose rate distribution is spatial distribution in which a total dose rate value is allocated to each pixel.

The embodiment described above illustrates the case in which the total dose rate distribution is generated using the attenuation characteristics, but the total dose rate distribution may be generated without using the attenuation characteristics. In this case, the processing circuitry 21 can generate the total dose rate distribution by positioning and summing up the dose rate distributions of the simultaneously applied beam directions.

When Step SA4 is performed, the processing circuitry 21 specifies a FLASH effect area and a non-FLASH effect area by executing the area specification function 215 (Step SA5). At Step SA5, the processing circuitry 21 specifies a FLASH effect area and a non-FLASH effect area based on the total dose rate distribution generated at Step SA4. Specifically, the processing circuitry 21 compares the total dose rate value of each pixel of the total dose rate distribution with a threshold. The threshold is set to any value among a range of the dose rate value with which it is estimated that the FLASH effect is acquired. As an example, a threshold Th is set as the lower limit value of the range. The processing circuitry 21 specifies pixels each having the total dose rate value larger than the threshold as the FLASH effect area, and specifies pixels each having the total dose rate value smaller than the threshold as the non-FLASH effect area, from the total dose rate distribution.

Figure 9:
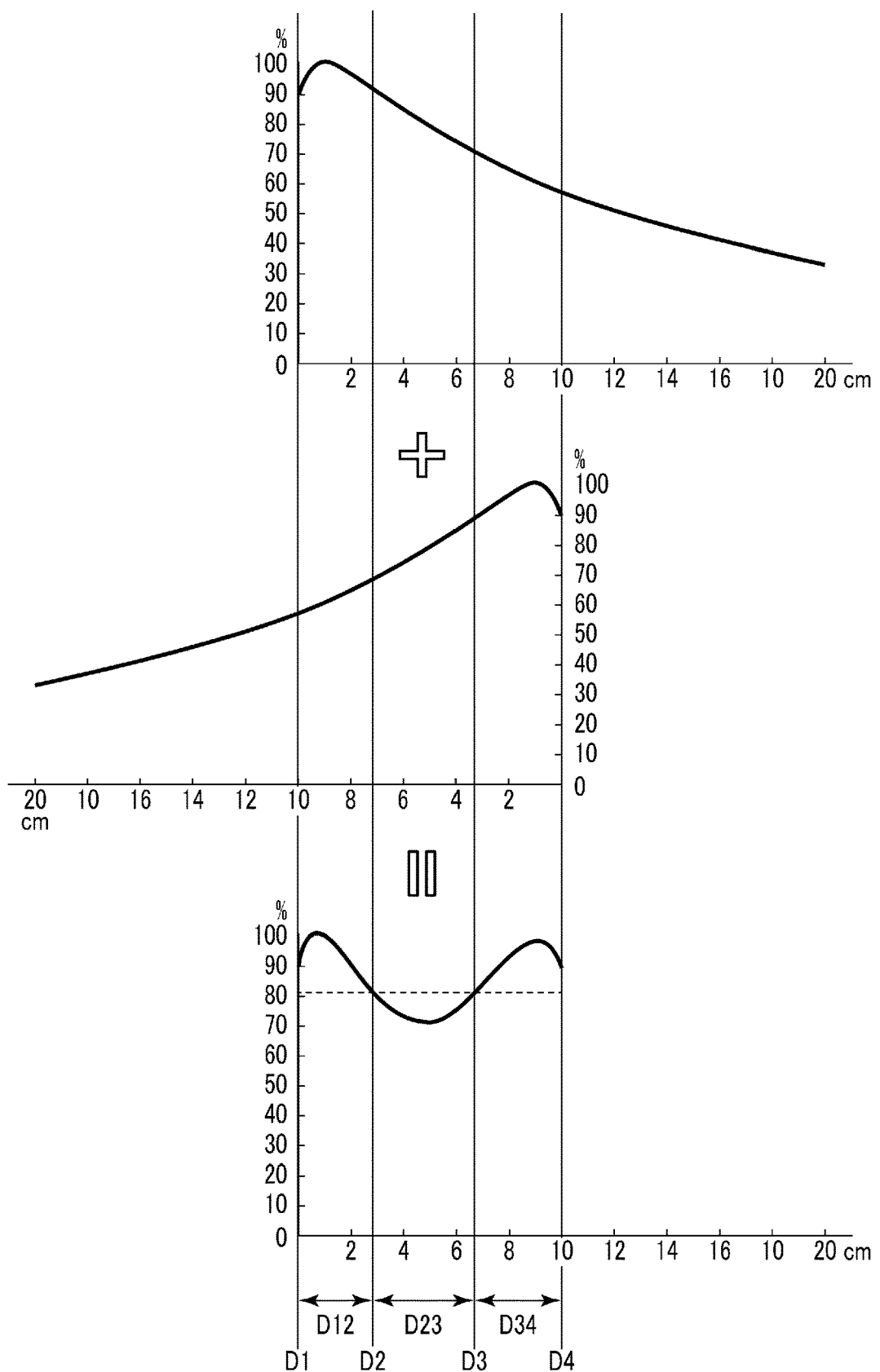
FIG. 9 is a diagram illustrating a specification process for a FLASH effect area and a non-FLASH effect area.

FIG. 9 is a diagram illustrating a specification process for a FLASH effect area and a non-FLASH effect area. The upper part of FIG. 9 illustrates the distribution of the total dose rates in the depth direction of the forward-direction radiation beams, the middle part of FIG. 9 illustrates the distribution of the total dose rates in the depth direction of the radiation beams of a 180° direction (opposite direction) with respect to the forward direction, and the lower part of FIG. 9 illustrates a total of the distribution of the total dose rates in the depth direction of the forward-direction radiation beams and the distribution of the total dose rates in the depth direction of the radiation beams of the opposite direction. The width of the irradiation area in FIG. 9 is 10 cm, and opposed two-field irradiation in the forward direction and the opposite direction is scheduled. As illustrated in the lower part of FIG. 9, the processing circuitry 21 compares the total dose rate with the threshold Th. As an example, the threshold Th is set to "total dose rate value=80%". An area D12, an area D34 are specified as FLASH effect areas. The area D12 ranges from a body surface depth (0 cm) D1 to a point D2 (3 cm) at which the total dose rate value crosses the threshold Th from above. The area D34 ranges from a body surface depth (10 cm) to a point D3 (7 cm) at which the total dose rate value crosses the threshold Th from above. An area D23 between the point D2 and the point D3 is specified as the non-FLASH effect area, because the total dose rate therein is smaller than the threshold Th.

When Step SA5 is performed, the processing circuitry 21 displays the medical image, the total dose rate distribution, the FLASH effect areas, and the non-FLASH effect area by executing the display control function 218 (Step SA6). At Step SA6, the processing circuitry 21 displays a display screen including the medical image, the total dose rate distribution, the FLASH effect areas, and the non-FLASH effect area on the display device 25.

Figure 10:
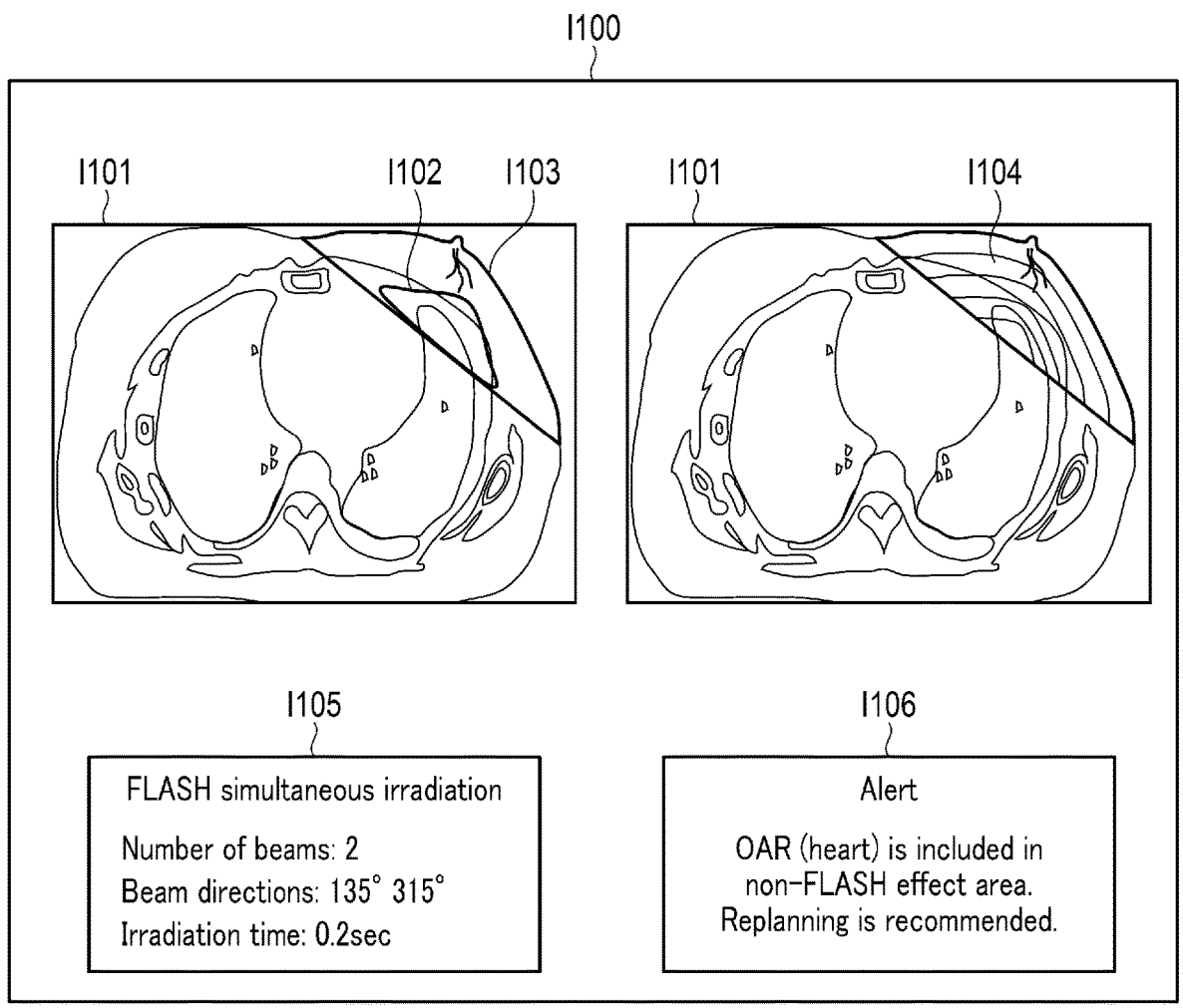
FIG. 10 is a diagram illustrating an example of a display screen displayed at Step SA6.

FIG. 10 is a diagram illustrating an example of a display screen I100 displayed at Step SA6. As illustrated in FIG. 10, the display screen I100 displays a medical image I101 in which a non-FLASH effect area 102 and a FLASH effect area 1103 are emphasized. By emphasizing the non-FLASH effect area 102 and the FLASH effect area 1103 in the medical image I101, it is enabled to recognize the anatomical positions of the non-FLASH effect area 102 and the FLASH effect area 1103.

As illustrated in FIG. 10, the display screen I100 further displays another medical image I101 in which a total dose rate value distribution 1104 is superimposed. In the total dose rate value distribution 1104, each pixel is displayed with a color value corresponding to its total dose rate value. The total dose rate value distribution 1104 is desirably displayed in a semitransparent manner such that the medical image I101 displayed behind it can be visually recognized. By displaying the total dose rate value distribution 1104 superimposed on the medical image I101, it is enabled to visually recognize the total dose rate of each anatomical position.

As illustrated in FIG. 10, the display screen I100 may be further provided with a display field 1105 for beam conditions. In the display field 1105, numerical values of the number of beams, the beam directions, and the irradiation time are displayed. This structure enables recognition of the beam conditions with numerical values. A display field 1106 for a determination result at Step SA7 may be further displayed in the display screen I100.

When Step SA6 is performed, the processing circuitry 21 determines whether a normal tissue area or an OAR area is included in the non-FLASH effect area by executing the area determination function 216 (Step SA7). If a normal tissue area or an OAR area is included in the non-FLASH effect area, it means that there is a high risk of great damage to the normal tissue area or the OAR area by the radiation beam. By contrast, if the normal tissue area or the OAR area is included in the FLASH effect area, it means that there is little possibility of great damage to the normal tissue area or the OAR area by the radiation beam.

As illustrated in FIG. 10, the determination result at Step SA7 is desirably displayed in the display field 1106. As an example, FIG. 10 illustrates an alert message displayed in a case where the heart area serving as the OAR area is included in the non-FLASH effect area. In this case, there is a high risk that the heart area is damaged by the radiation beam, it is recommended to change the radiotherapy plan. For this reason, it is desirable to display a message recommending replanning, such as "OAR: heart is included in non-FLASH effect area. Replanning is recommended."

At Step SA7, if it is determined that a normal tissue area or an OAR area is included in the non-FLASH effect area (Step SA7: YES), the processing circuitry 21 changes the beam conditions of the radiation beams, such as the irradiation time, the number of beams, and the beam directions, by executing the radiotherapy plan change function 217 (Step SA8). At Step SA8, the processing circuitry 21 changes the irradiation time, the number of beams, and the beam directions such that no normal tissue area or OAR area is included in the non-FLASH effect area. As an example, it is possible to move the non-FLASH effect area by uniformly changing the beam directions of simultaneously applied radiation beams. As another example, the shape and/or the size of the non-FLASH effect area can be changed by adding radiation beams of different beam directions under the same irradiation dose. As another example, the size of the non-FLASH effect area can be enlarged or reduced by increasing or reducing the irradiation time. These change operations may be used in combination. The method for changing the irradiation time, the number of beams, and the beam directions is not specifically limited. The method may be manually performed by the user via the input device 27, or automatically performed using various types of machine learning algorithms.

Step SA3 to Step SA7 are performed again under the changed beam conditions.

Step SA3 to Step SA8 are repeated until it is determined at Step SA7 that no normal tissue area or OAR area is included in the non-FLASH effect area.

At Step SA7, if it is determined that no normal tissue area or OAR area is included in the non-FLASH effect area (Step SA7: NO), the processing circuitry 21 settles the radiotherapy plan by executing the radiotherapy plan change function 217 (Step SA9). At Step SA9, the processing circuitry 21 sets the current radiotherapy plan as a settled version. The radiotherapy plan of the settled version is transmitted to the radiotherapy apparatus 3. The radiotherapy apparatus 3 performs radiotherapy by FLASH irradiation on the patient in accordance with the received radiotherapy plan.

When Step SA9 is performed, the radiotherapy plan process according to the first embodiment is ended.

As described above, the radiotherapy planning apparatus 2 includes the processing circuitry 21. The processing circuitry 21 obtains a medical image relating to the patient. The processing circuitry 21 obtains the number of beams and the beam directions of a plurality of radiation beams applied substantially simultaneously to the irradiation area of the patient. The processing circuitry 21 generates total dose rate distribution serving as spatial distribution of total values of predicted dose rates of the radiation beams to be applied to the patient, based on the medical image and the number of beams and the beam directions of the radiation beams.

The structure described above enables the user to check the total dose rate serving as spatial distribution of total values of predicted dose rates of radiation beams to be applied to the patient. By checking the total dose rate, the user is enabled to accurately recognize distribution of dose rates in the simultaneous multiple field FLASH irradiation. In addition, by realizing simultaneous multiple field irradiation by FLASH irradiation, the dose rates in multiple directions can be combined in the body of the patient, and the FLASH effect area can be increased in comparison with the case of using single field irradiation.

In addition, the radiotherapy planning apparatus 2 according to the first embodiment specifies a FLASH effect area and/or a non-FLASH effect area based on the total dose rate distribution, and displays the FLASH effect area and/or the non-FLASH effect area in a visually distinguishable manner in the medical image. In addition, the radiotherapy planning apparatus 2 according to the first embodiment outputs a determination result as to whether a normal tissue area and/or an OAR area is included in the non-FLASH effect area, and displays the determination result. The radiotherapy planning apparatus 2 according to the first embodiment also performs replanning if a normal tissue area and/or an OAR area is included in the non-FLASH effect area. The structure described above enables detection of existence of a non-FLASH effect area before radiotherapy, and notification thereof to the user and/or replanning. This structure enhances the reliability of simultaneous multiple field FLASH irradiation and enables safe execution thereof.

Second Embodiment

The radiotherapy planning apparatus 2 according to the first embodiment described above is configured to determine whether to change the beam conditions according to whether a normal tissue area and/or an OAR area is included in the non-FLASH effect area. A radiotherapy planning apparatus 2 according to the second embodiment determines whether to change the beam conditions according to a ratio of a net simultaneous irradiation time to an entire irradiation time and/or a ratio of non-FLASH irradiation time. The term "entire irradiation time" means a time length for which at least one radiation beam of a plurality of radiation beams to be simultaneously applied is applied. The term "net simultaneous irradiation time" means a time length for which all the radiation beams to be simultaneously applied are simultaneously applied. The non-FLASH irradiation time is time acquired by subtracting the net simultaneous irradiation time from the entire irradiation time. Specifically, the term "non-FLASH irradiation time" means a time length for which a plurality of radiation beams to be simultaneously applied are applied non-simultaneously. The following is an explanation of the radiotherapy planning apparatus 2 according to the second embodiment. In the following explanation, constituent elements having substantially the same functions as those of the first embodiment will be denoted by the same reference numerals, and an overlapping explanation thereof will be made only when necessary.

Figure 11:
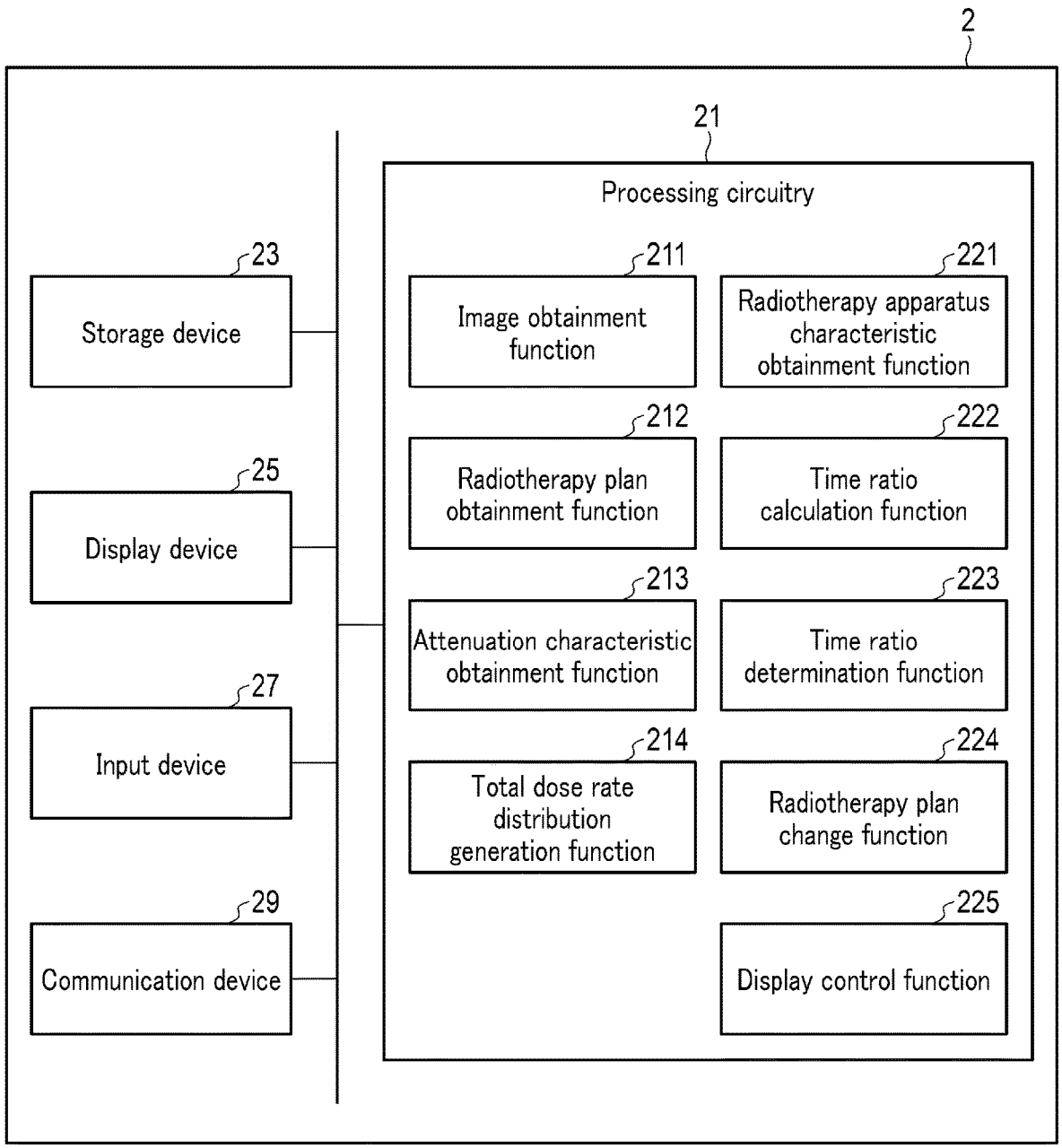
FIG. 11 is a diagram illustrating a configuration example of a radiotherapy planning apparatus according to a second embodiment.

FIG. 11 is a diagram illustrating a configuration example of the radiotherapy planning apparatus 2 according to the second embodiment. As illustrated in FIG. 11, a processing circuitry 21 of the radiotherapy planning apparatus 2 according to the second embodiment realizes an image obtainment function 211, a radiotherapy plan obtainment function 212, an attenuation characteristic obtainment function 213, a total dose rate distribution generation function 214, a radiotherapy apparatus characteristic obtainment function 221, a time ratio calculation function 222, a time ratio determination function 223, a radiotherapy plan change function 224, and a display control function 225.

By executing the radiotherapy apparatus characteristic obtainment function 221, the processing circuitry 21 obtains characteristic (hereinafter referred to as "radiotherapy apparatus characteristics") relating to radiation irradiation of the radiotherapy apparatus 3 used for radiotherapy. A time difference (hereinafter referred to as "irradiation time difference") of radiation beam irradiation between beam directions of a plurality of radiation beams simultaneously applied is obtained as radiotherapy apparatus characteristics. The irradiation time difference includes a difference in start timing of radiation beam irradiation and/or a difference in time length.

By executing the time ratio calculation function 222, the processing circuitry 21 calculates a ratio of the net simultaneous irradiation time and/or the non-FLASH irradiation time to the entire irradiation time. The ratio of the net simultaneous irradiation time to the entire irradiation time is referred to as "simultaneous irradiation time ratio", and the ratio of the non-FLASH irradiation time to the entire irradiation time is referred to as "non-FLASH irradiation time ratio". As described above, the term "entire irradiation time" means a time length for which at least one radiation beam of a plurality of radiation beams to be simultaneously applied is applied. The term "net simultaneous irradiation time" means a time length for which all the radiation beams to be simultaneously applied are simultaneously applied. The non-FLASH irradiation time is time acquired by subtracting the net simultaneous irradiation time from the entire irradiation time. The structure is based on the premise that the FLASH effect is acquired only in the case where all the radiation beams to be simultaneously applied are simultaneously applied. The entire irradiation time, the net simultaneous irradiation time, and the non-FLASH irradiation time are calculated based on the irradiation time difference specified by the radiotherapy apparatus characteristic obtainment function 221.

By executing the time ratio determination function 223, the processing circuitry 21 outputs a determination result relating to whether the simultaneous irradiation time ratio calculated by the time ratio calculation function 222 is smaller than a first threshold, and/or whether the non-FLASH irradiation time ratio is larger than a second threshold. The determination result is displayed by the display control function 225.

By executing the radiotherapy plan change function 224, the processing circuitry 21 changes the radiotherapy plan obtained by the radiotherapy plan obtainment function 212. As an example, the processing circuitry 21 changes the beam directions, the number of beams, and/or the irradiation time of the radiation beams, if the non-FLASH irradiation time ratio is larger than the second threshold by the time ratio determination function 223.

In the display control function 225, the processing circuitry 21 displays various types of information on the display device 25. As an example, the processing circuitry 21 displays the simultaneous irradiation time ratio calculated by the time ratio calculation function 222. As another example, the processing circuitry 21 displays the determination result output by the time ratio determination function 223.

The following is an explanation of a therapy planning process by the radiotherapy planning apparatus 2 according to the second embodiment.

Figure 12:
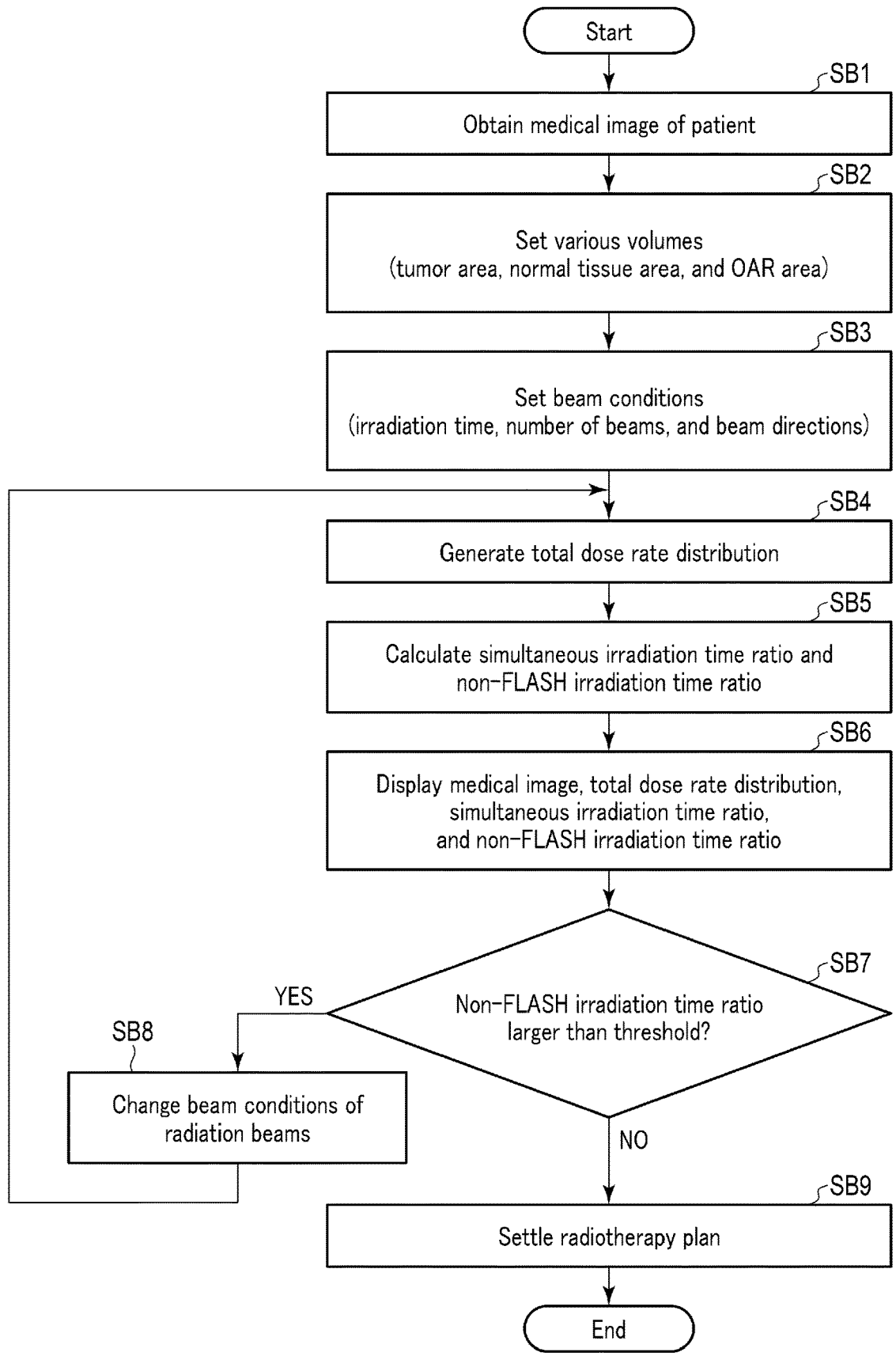
FIG. 12 is a diagram illustrating a procedure of a therapy planning process by the radiotherapy planning apparatus according to the second embodiment.

FIG. 12 is a diagram illustrating a procedure of a therapy planning process by the radiotherapy planning apparatus 2 according to the second embodiment. Step SB1 to Step SB4 are the same as Step SA1 to Step SA4 illustrated in FIG. 4, and an explanation thereof is omitted.

When Step SB4 is performed, the processing circuitry 21 calculates the simultaneous irradiation time ratio and the non-FLASH irradiation time ratio by realization of the time ratio calculation function 222 (Step SB5). At Step SB5, the processing circuitry 21 calculates the simultaneous irradiation time ratio and the non-FLASH irradiation time ratio, based on the radiotherapy apparatus characteristics specified in advance by the radiotherapy apparatus characteristic obtainment function 221.

The radiotherapy apparatus characteristics are measured by the radiotherapy apparatus 3 at the previous stage of Step SB5. As an example, measurement of the radiotherapy apparatus characteristics is performed with the following procedure. The radiotherapy apparatus 3 performs test irradiation of simultaneous multiple field FLASH irradiation for a combination of a plurality of irradiation devices 33, and measures a difference in start timing of radiation beam irradiation and a difference in irradiation time length between the irradiation devices 33. The term "start timing" means time from the set start timing to actual application of the radiation beam. Specifically, the difference in start timing is acquired by measuring the start timing for each of the irradiation devices 33 performing simultaneous multiple field FLASH irradiation, and measuring a difference between the start timings. The term "irradiation time length" means actual irradiation duration from the start timing to the end timing of the irradiation beam, when the radiation beams are simultaneously applied for the set duration. Specifically, the difference in irradiation time length is acquired by measuring the irradiation time length for each of the irradiation devices 33 performing simultaneous irradiation, and measuring a difference between the irradiation time lengths. The irradiation time lengths can occur due to mechanical and/or control factors, such as individual differences of the irradiation devices 33.

FIG. 13 is a diagram illustrating an example of calculation of the simultaneous irradiation time ratio. In the example of FIG. 13, the number of beams of simultaneous irradiation is 3, that is, beam directions A, B, and C. The dose is 8 Gy/time, and the set irradiation time is 0.2 seconds. An irradiation time difference is calculated for each of the beam directions A, B, and C. The beam direction A has a start timing TA1 that is the same as the set start timing and an end timing TA2 that is later than the set end timing by 0.01 second, and accordingly a time length thereof from the start timing TA1 to the end timing TA2 is longer than set time (hereinafter referred to as "simultaneous irradiation set time") 0.2 seconds by 0.01 second. The beam direction B has a start timing TB1 that is later than the set start timing TA1 by 0.01 second and an end timing TB2 that is the same as the set end timing, and accordingly a time length thereof from the start timing TB1 to the end timing TB2 is shorter than 0.2 seconds by 0.01 second. The beam direction C has a start timing TC1 that is earlier than the set start timing TA1 by 0.01 second and an end timing TC2 that is the same as the set end timing, and accordingly a time length thereof from the start timing TC1 to the end timing TC2 is longer than 0.2 seconds by 0.01 second.

The processing circuitry 21 calculates the entire irradiation time based on the irradiation time difference. In the example of FIG. 13, a time length for which at least one of radiation beams of the beam directions A, B, and C is applied is calculated as the entire irradiation time. Specifically, the entire irradiation time is a time length seconds from the start timing TC1 to the end timing TA2. In addition, the processing circuitry 21 calculates the net simultaneous irradiation time based on the irradiation time difference. In the example of FIG. 13, a time length for which all the radiation beams of the beam directions A, B, and C are simultaneously applied is calculated as the net simultaneous irradiation time. Specifically, the net simultaneous irradiation time is a time length 0.19 seconds from the start time TB1 to the end timings TB2 and TC2. The processing circuitry 21 calculates the ratio of the net simultaneous irradiation time to the entire irradiation time as the simultaneous irradiation time ratio. In the example of FIG. 13, "(net simultaneous irradiation time 0.19 seconds/entire irradiation time 0.22 seconds)×100=simultaneous irradiation time ratio 86%" is calculated. The non-FLASH irradiation time ratio is "100%-86%=14%".

The simultaneous irradiation time ratio may be converted into the dose rate. In this case, the simultaneous irradiation time ratio is "(net simultaneous irradiation time 0.19 seconds/entire irradiation time 0.22 seconds)×8 Gy=6.9 Gy", and 1.1 Gy being the remainder is the non-FLASH irradiation time ratio.

When Step SB5 is performed, the processing circuitry 21 displays the medical image, the total dose rate value distribution, the simultaneous irradiation time ratio, and the non-FLASH irradiation time ratio, by executing the display control function 225 (Step SB6). At Step SB6, the processing circuitry 21 displays a display screen including the medical image, the total dose rate value distribution, and the non-FLASH irradiation time ratio on the display device 25.

FIG. 14 is a diagram illustrating an example of a display screen 1140 displayed at Step SB6. Suppose that the example illustrated in FIG. 14 adopts three-field simultaneous irradiation. As illustrated in FIG. 14, a medical image 1141 on which a total dose rate value distribution 1142 is superimposed is displayed in the display screen 1140. In the total dose rate value distribution 1142, each pixel is displayed with a color value corresponding to its total dose rate value. The total dose rate value distribution 1142 is desirably displayed in a semitransparent manner such that the medical image 1141 displayed behind it can be visually recognized. By displaying the total dose rate value distribution 1142 superimposed on the medical image 1141, it is enabled to visually recognize the total dose rate of each anatomical position.

As illustrated in FIG. 14, the display screen 1140 is further provided with a display field 1143. In the display field 1143, numerical values of the entire irradiation time, the net simultaneous irradiation time, the simultaneous irradiation time ratio, and the non-FLASH irradiation time ratio are displayed in addition to beam conditions, such as the number of beams, the beam directions, and the irradiation time. This structure enables recognition of the entire irradiation time, the net simultaneous irradiation time, the simultaneous irradiation time ratio, and the non-FLASH irradiation time ratio with numerical values. A numerical value of the threshold may also be displayed in the display field 1143. The threshold is used for determination at Step SB7. A display field 1144 for a determination result at Step SB7 may be further displayed in the display screen 1140.

When Step SB6 is performed, the processing circuitry 21 determines whether the non-FLASH irradiation time ratio is larger than the threshold by executing the time ratio determination function 223 (Step SB7). If the non-FLASH irradiation time ratio is smaller than the threshold, because most of the dose applied to the patient by the simultaneous multiple field FLASH irradiation contributes to the FLASH effect, it is expected that comparatively safe radiotherapy is performed with small damage to the patient due to the radiation beams. By contrast, if the non-FLASH irradiation time ratio is larger than the threshold, because most of the dose applied to the patient by the simultaneous multiple field FLASH irradiation does not contribute to the FLASH effect, it means that there is a high risk of great damage to the patient due to the radiation beams. The threshold can be set to any empirically appropriate value via the input device 27. For example, the threshold can be set to 20% or around.

As illustrated in FIG. 14, the determination result at Step SB7 is desirably displayed in the display field 1144. As an example, FIG. 14 illustrates an alert message displayed in a case where the non-FLASH irradiation time ratio is larger than the threshold. In this case, a message recommending replanning is desirably displayed, such as "The non-FLASH irradiation time ratio is larger than the threshold. Replanning is recommended."

At Step SB7, if it is determined that the non-FLASH irradiation time ratio is not smaller than the threshold (Step SB7: NO), the processing circuitry 21 changes the beam conditions of the radiation beams, such as the irradiation time, the number of beams, and the beam directions, by executing the radiotherapy plan change function 217 (Step SB8). At Step SB8, the processing circuitry 21 desirably refers to the irradiation time difference of each of the irradiation devices 33 and changes the beam direction to the beam direction with a small irradiation time difference, to reduce the irradiation time differences of the simultaneously applied radiation beams and increase the simultaneous irradiation time ratio or reduce the non-FLASH irradiation time ratio. The simultaneous irradiation time ratio may be increased or the non-FLASH irradiation time ratio may be reduced without changing the beam direction by adjusting the mechanical system or the control system of the irradiation devices 33.

Step SB3 to Step SB7 are performed again under the changed beam conditions. Step SB3 to Step SB8 are repeated until it is determined at Step SB7 that the non-FLASH irradiation time ratio is smaller than the threshold.

At Step SB7, if it is determined that the non-FLASH irradiation time ratio is smaller than the threshold (Step SB7: YES), the processing circuitry 21 settles the radiotherapy plan by executing the radiotherapy plan change function 217 (Step SB9). At Step SB9, the processing circuitry 21 sets the current radiotherapy plan as a settled version. The radiotherapy plan of the settled version is transmitted to the radiotherapy apparatus 3. The radiotherapy apparatus 3 performs radiotherapy by FLASH irradiation on the patient in accordance with the received radiotherapy plan.

When Step SB9 is performed, the radiotherapy plan process according to the second embodiment is ended. Various changes are possible for the therapy planning process according to the second embodiment. As an example, the simultaneous irradiation time ratio is not necessarily calculated at Step SB5. As another example, it may be determined whether the simultaneous irradiation time ratio is smaller than the threshold, instead of determining whether the non-FLASH irradiation time ratio is larger than the threshold. As another example, whether to change the beam conditions may be determined based on a logical sum (OR) or a logical product (AND) of the determination result as to whether the non-FLASH irradiation time ratio is larger than the threshold and the determination result as to whether the simultaneous irradiation time ratio is smaller than the threshold.

As described above, the radiotherapy planning apparatus 2 according to the second embodiment determines whether to change the beam conditions, according to the simultaneous irradiation time ratio and/or the non-FLASH irradiation time ratio. This structure enables detection of defectiveness of the FLASH effect due to the irradiation time difference in advance before radiotherapy, and notification thereof to the user and/or replanning. This structure enhances the reliability of simultaneous multiple field FLASH irradiation and enables safe execution thereof.

The first embodiment and the second embodiment may be combined. Specifically, the radiotherapy planning apparatus 2 may determine whether to change the beam conditions, based on both presence/absence of a normal tissue area and/or an OAR area in the non-FLASH effect area and comparison of the threshold with the simultaneous irradiation time ratio and/or the non-FLASH irradiation time ratio.

At least one of the embodiments described above enables accurate recognition of distribution of the dose rate applied to the patient, in a radiotherapy plan in which a plural number of radiation beams are applied in a plurality of beam directions to the patient substantially simultaneously with a high dose and for a short time (FLASH irradiation).

The term "processor" used in the above explanation indicates, for example, a circuit, such as a CPU, a GPU, or an Application Specific Integrated Circuit (ASIC), and a programmable logic device (for example, a Simple Programmable Logic Device (SPLD), a Complex Programmable Logic Device (CPLD), and a Field Programmable Gate Array (FPGA)). The processor realizes its function by reading and executing the program stored in the storage circuitry. The program may be directly incorporated into the circuit of the processor instead of being stored in the storage circuit. In this case, the processor implements the function by reading and executing the program incorporated into the circuit. By contrast, if the processor is, for example, an ASIC, the function is directly incorporated as a logical circuit into the circuit of the processor, instead of being stored in the storage circuit. Each processor of the present embodiment is not limited to a case where each processor is configured as a single circuit; a plurality of independent circuits may be combined into one processor to realize the function of the processor. Further, a plurality of constituent elements illustrated in FIG. 1, FIG. 3, and FIG. 11 may be integrated into one processor to achieve their functions.

While certain embodiments have been described, these embodiments have been presented by way of example only, and are not intended to limit the scope of the inventions. Indeed, the embodiments described herein may be embodied in a variety of other forms; furthermore, various omissions, substitutions, changes, and combinations of embodiments in the form of the embodiment described herein may be made without departing from the spirit of the invention. The accompanying claims and their equivalents are intended to cover such forms or modifications as would fall within the scope and spirit of the invention.

What is claimed is:

1. A radiotherapy planning apparatus, comprising:
   processing circuitry configured to:
   obtain a medical image relating to a patient, obtain a number of beams and beam directions of a plurality of radiation beams applied substantially simultaneously to an irradiation area of the patient, and generate a total dose rate distribution, which is a spatial distribution of total values of predicted dose rates of the plurality of radiation beams to be applied to the patient, based on the obtained medical image and the obtained number and the beam directions of the plurality of radiation beams, wherein the processing circuitry is further configured to:

specify a first internal area in which a FLASH effect is acquired and/or a second internal area in which no FLASH effect is acquired based on the generated total dose rate distribution, and display the first internal area and/or the second internal area in a visually distinguishable manner in the medical image.

2. The radiotherapy planning apparatus according to claim 1, wherein the processing circuitry is further configured to output a first determination result as to whether a normal tissue area and/or an OAR area is included in the second internal area, and display the first determination result.

3. The radiotherapy planning apparatus according to claim 2, wherein the processing circuitry is further configured to change the beam directions, the number of beams, and/or an irradiation time of the plurality of radiation beams, when the first determination result indicating that the normal tissue area is included in the second internal area is obtained.

4. The radiotherapy planning apparatus according to claim 1, wherein the processing circuitry is further configured to:

obtain attenuation characteristics indicating a relation between a depth from a body surface of the patient and an attenuation of a dose or a dose rate, for each of the beam directions, and generate the total dose rate distribution based on the attenuation characteristics, the medical image, and the number of beams and the beam directions of the plurality of radiation beams.

5. The radiotherapy planning apparatus according to claim 1, wherein the processing circuitry is further configured to display the total dose rate distribution.

6. A radiotherapy planning apparatus 3, comprising:

processing circuitry configured to:

obtain a medical image relating to a patient, obtain a number of beams and beam directions of a plurality of radiation beams applied substantially simultaneously to an irradiation area of the patient, and generate a total dose rate distribution, which is a spatial distribution of total values of predicted dose rates of the plurality of radiation beams to be applied to the patient, based on the obtained medical image and the obtained number and the beam directions of the plurality of radiation beams, wherein the processing circuitry is further configured to calculate a first ratio or a second ratio, the first ratio is a ratio of a second time length for which all the plurality of radiation beams are simultaneously applied to a first time length for which at least one radiation beam of the plurality of radiation beams is applied, the second ratio being a ratio of a third time length to the first time length, and the third time length being acquired by subtracting the second time length from the first time length, and the processing circuitry is further configured to output a second determination result relating to whether the first ratio is smaller than a first threshold and/or whether the second ratio is larger than a second threshold.

7. The radiotherapy planning apparatus according to claim 6, wherein the processing circuitry is further configured to:

obtain a time difference of radiation beam irradiation between the beam directions relating to a radiotherapy apparatus used for radiotherapy for the patient, and calculate the first time length, the second time length, and the third time length based on the obtained time difference.

8. The radiotherapy planning apparatus according to claim 7, wherein the time difference includes a difference in start timing of irradiation of radiation beam irradiation and/or a difference in time length.

9. The radiotherapy planning apparatus according to claim 7, wherein the processing circuitry is further configured to change the beam directions, the number of beams, and/or an irradiation time of the plurality of radiation beams, when the second determination result indicating that the first ratio is smaller than the first threshold and/or the second ratio is larger than the second threshold is acquired.

10. A radiotherapy system, comprising:

a radiotherapy planning apparatus producing a radiotherapy plan relating to radiotherapy in which a plural number of radiation beams are applied in a plurality of beam directions to a patient substantially simultaneously with a high dose and for a short time; and a radiotherapy apparatus applying the plural number of the radiation beams in the plurality of beam directions to the patient substantially simultaneously with a high dose and for a short time in accordance with the radiotherapy plan, wherein the radiotherapy planning apparatus;

obtains a medical image relating to the patient, obtains the number of beams and the plurality of beam directions of the radiation beams applied substantially simultaneously to an irradiation area of the patient, and generates a total dose rate distribution, which is a spatial distribution of total values of predicted dose rates of the radiation beams to be applied to the patient, based on the obtained medical image and the number and the beam directions of the radiation beams, and wherein the radiotherapy planning apparatus further specifies a first internal area in which a FLASH effect is acquired and/or a second internal area in which no FLASH effect is acquired, based on the generated total dose rate distribution, and displays the first internal area and/or the second internal area in a visually distinguishable manner in the medical image.

* * * * *